United States Patent
Yen

[11] Patent Number: 6,008,983
[45] Date of Patent: Dec. 28, 1999

[54] ADJUSTING DEVICE FOR A SCREEN OF A COMPUTER

[76] Inventor: Jung-Chuan Yen, No. 1, Lane 633, Sec. 1, Ching-Sha Street, Tainan, Taiwan

[21] Appl. No.: 08/902,266

[22] Filed: Jul. 29, 1997

[51] Int. Cl.⁶ .................................................. G06F 1/16
[52] U.S. Cl. ...................... 361/681; 361/680; 248/917; 248/918
[58] Field of Search ................... 361/680, 681; 364/708.1; 248/917, 918, 919, 920, 921, 922

[56] References Cited

U.S. PATENT DOCUMENTS

| | | | |
|---|---|---|---|
| 5,196,993 | 3/1993 | Herron et al. | 361/680 |
| 5,355,278 | 10/1994 | Hosoi et al. | 361/680 |
| 5,375,076 | 12/1994 | Goodrich et al. | 361/680 |
| 5,383,138 | 1/1995 | Motoyama et al. | 364/708.1 |
| 5,396,399 | 3/1995 | Blair et al. | 361/681 |
| 5,596,482 | 1/1997 | Horikoshi | 361/680 |
| 5,646,818 | 7/1997 | Hahn | 361/681 |
| 5,668,570 | 9/1997 | Ditzik | 361/681 |
| 5,818,360 | 10/1998 | Chu et al. | 361/680 |
| 5,835,344 | 11/1998 | Alexander | 364/708.1 |
| 5,871,094 | 2/1999 | Leibowitz | 248/918 |

*Primary Examiner*—Donald Sparks
*Assistant Examiner*—John D. Reed
*Attorney, Agent, or Firm*—Rosenberg, Klein & Lee

[57] ABSTRACT

An adjusting device for a screen of a computer includes a keyboard and a screen combined together with the adjusting device for adjusting the position of the screen from the keyboard and a sloping angle of the screen to the keyboard to suit to different size of a user. The device includes two support bars pivotally connected between the screen and two bottom bars fitting and movable in the bottom of the keyboard in a preset distance from the keyboard. Then the dimensions of the keyboard to sit on a table may be increased to stabilize the computer securely. Further, the angle of the screen to the keyboard can be adjusted by pivotal connection of the support bars with the screen and also with the bottom bars.

3 Claims, 7 Drawing Sheets

ADJUSTING DEVICE FOR A SCREEN OF A COMPUTER

BACKGROUND OF THE INVENTION

This invention concerns an adjusting device for a screen of a computer, particularly combining a keyboard and a screen with the adjusting device, enabling the screen pulled back and forth by two bottom bars moved out of and in the keyboard to increase dimensions of the keyboard sitting on a table so that the computer may be sit more stably on the table. And at the same time, the screen is pivotally connected with two support bars so that the screen may be adjusted in its angle to the keyboard.

Conventional computers, especially having a small size as shown in FIG. 7, are made portable to be carried. They generally have a keyboard and a screen connected pivotally with each other so that the screen may be swung up for use from a collapsed position. However, the dimensions of the keyboard is the contact dimensions to sit on a table. When the screen is swung up to stand sloping to rearward, the gravitational center will move rearward, and if the contact dimensions of the keyboard with the table is not enough to support the screen, the screen with the keyboard or the computer may fall back, and may be broken or worse. And chances are that a user has to adjust sitting pose so as to view the screen better, moving his/her body, resulting in fatigue of the body in case of long use.

SUMMARY OF THE INVENTION

The purpose of the invention is to offer an ad-adjusting device for a screen of a computer for adjusting the distance between the screen and a keyboard to increase dimensions for the keyboard to sit on a table so as to securing the computer on the table without possibility of falling backward in case of the screen swung open for use. Further the screen may be adjusted also in its angle to the keyboard.

The feature of the adjusting device of the invention is two support bars pivotally connected with the screen and the support bars also pivotablly connected at its lower ends with two vertical wall of two bottom bars provided to fit in and able to move out of a bottom of the keyboard guided by two guide screws fixed with an inner end of the two bottom bars connected with a lateral plate to move at the same time when the screen 2 is pushed backward or forward relative to the keyboard.

DETAILED DESCRIPTION OF THE PREFERRED EMODIEMNT

Figure 1:
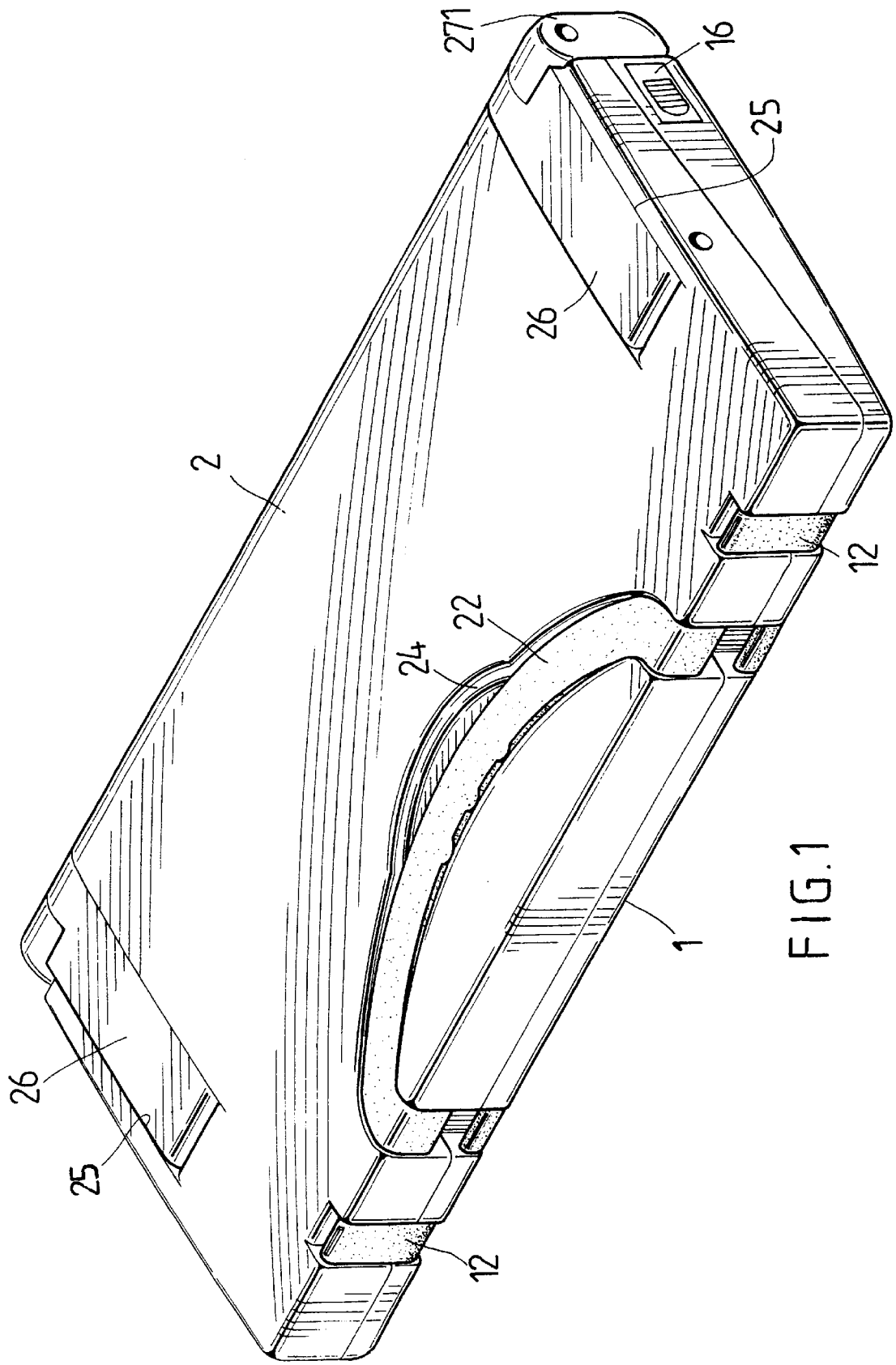
FIG. 1 is a perspective view of a computer with an adjusting device for a screen in the present invention.
Figure 2:
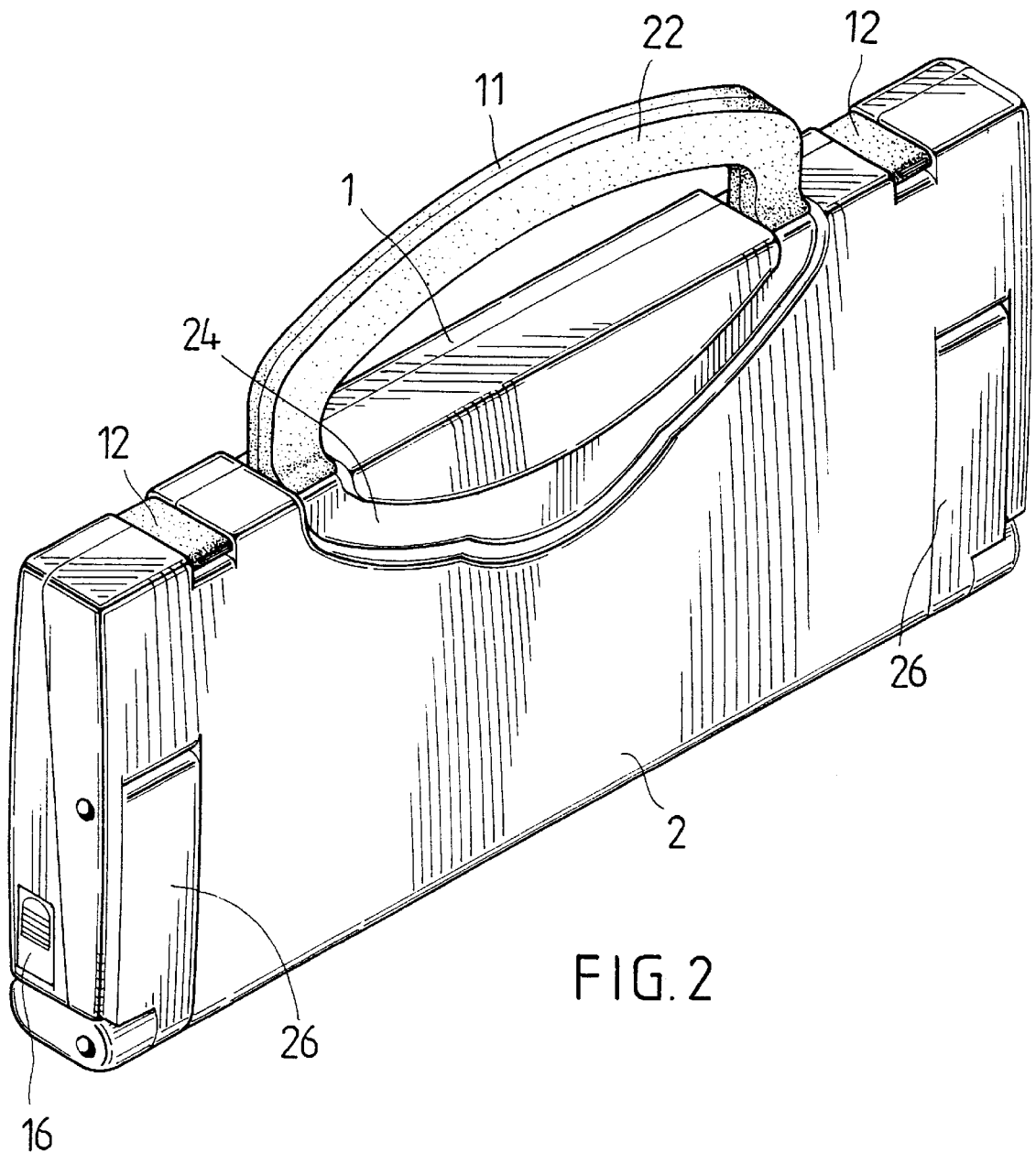
FIG. 2 is a perspective view of the computer with a grip pulled out for carrying in the present invention.
Figure 3:
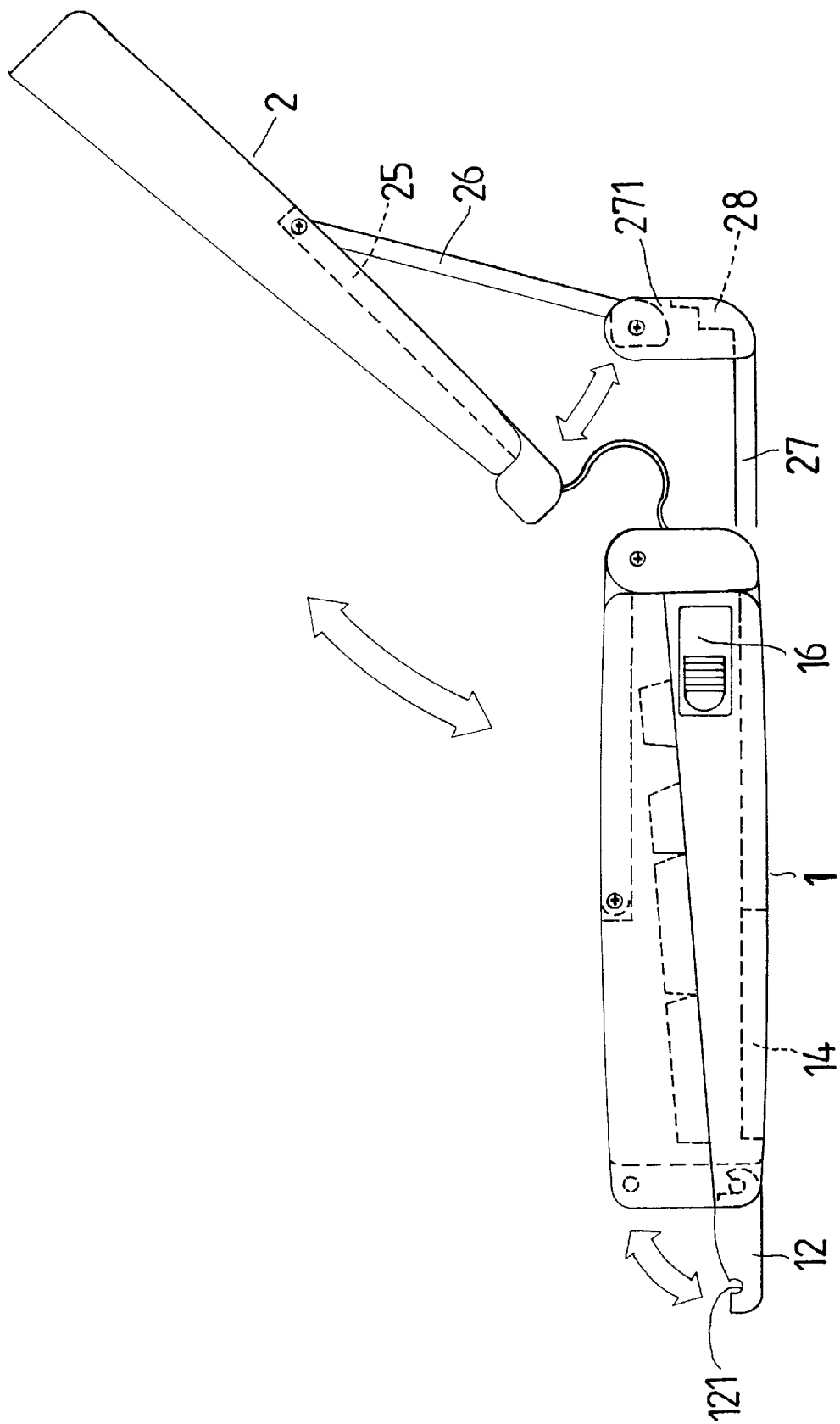
FIG. 3 is a side view of the computer with a screen swung out for use in the present invention.

A preferred embodiment of a computer with an adjusting device for a screen in the present invention, as shown in FIGS. 1, 2 and 3, includes a keyboard 1 and a screen 2.

The keyboard 1 has a grip 11 pivotally connected with a front side, a latch 12 fixed respectively on two sides of the grip 11 on the front side and having an engage groove 121 in an inner side to engage with a lateral bar 23 respectively on two opposite sides of a front side of the screen 2. Further the keyboard 1 has a curved recess 24 in a lower surface for the grip 11 to fit therein in case of not for carrying. The keyboard 1 also has an elongate recess 14 respectively in two sides of the bottom for a bottom bar 27 of the screen 2 to fit and move back and forth therein, and a guide slot 141 in bottom side of the recess 14 for a guide screw 272 fixed on a front end of each bottom bar 27 to fit and move back and forth therein. Further, on a side of the keyboard 1 is formed a battery chamber 16 for containing therein a battery as a power source of the computer.

The screen 2 has a display surface 21 on an inner side, a grip 22 pivotally connected with a front side, a lateral bar 23 respectively fixed at both sides of the grip 22 for each of the two latches 12, 12 of the keyboard 1 to engage so as to lock the screen 2 with the keyboard 1 in case the computer is not to be used. The screen further has a curved recess 24 in a front portion of an upper surface for receiving the grip 22 therein in case of the grip 22 unused. The curved recess 24 is shaped as the same as that 24 of the keyboard 1. Further, the screen 2 has a recess 25 respectively in two sides of the upper surface, and a support bar 26 having an upper end pivotally connected with an upper end of each recess 24, in which the support bar may lie therein in case of the screen 2 collapsed on the keyboard 1. The lower end of each support bar 26 is pivotally and properly tightly connected with a vertical wall 271 at an outer end of each of two bottom bar 27 connected with a lateral plate 28. A front end of each bottom bar 27 is fixed with a guide screw 272 fitted and move in each guide slot 141 of the keyboard 1 so that the screen may be moved rearward to any point in the same distance as the length of the guide slots 141, 141.

When the computer is not used, the screen 2 is collapsed by pushing it down from a swung-out position on the keyboard 1 to a collapsed position, with the latches 12, 12 locking the lateral bars 23, 23 to keep the screen 2 in the collapsed position. And the grips 12 and 22 are respectively pushed in the recesses 24, 24 of the keyboard 1 and the screen 2, as shown in FIG. 1.

In case that the computer is to be carried out, the grips 12 and 22 are pulled out of the recesses 24 and held in a hand, as shown in FIG. 2.

Figure 4:
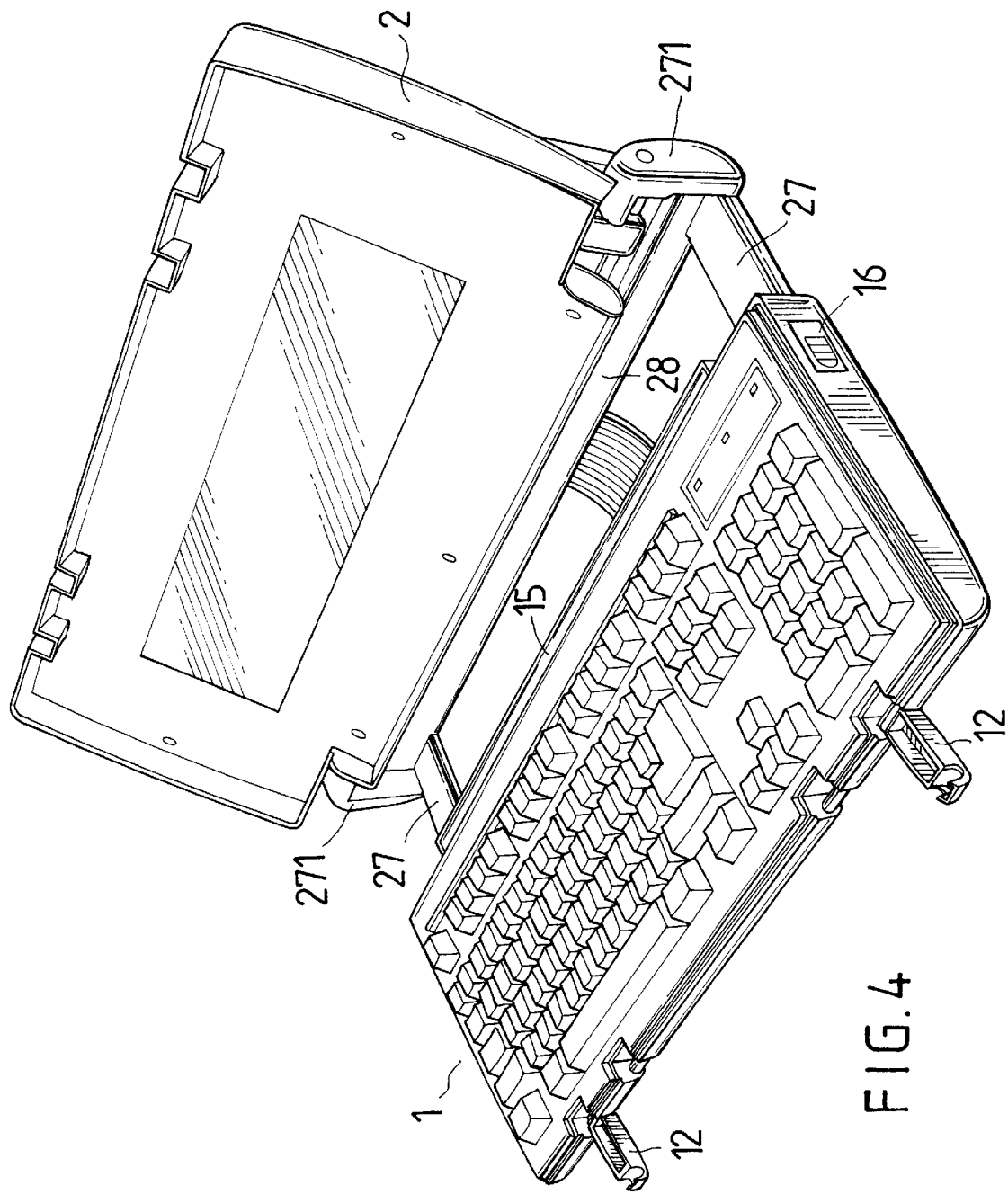
FIG. 4 is a perspective view of the computer with the screen swung out for use in the present invention.

If the computer is to be used, the latches 12, 12 are first snapped open, disengaged from the lateral bars 23, 23 and freeing the screen 2, which is then swung upward to the swung position wherein the screen 2 stands a little sloped rearward as shown in FIG. 4. Then the dimensions of the keyboard 1 sitting on a table may be adjusted, and the sloping angle of the screen may adjusted as well.

Figure 5:
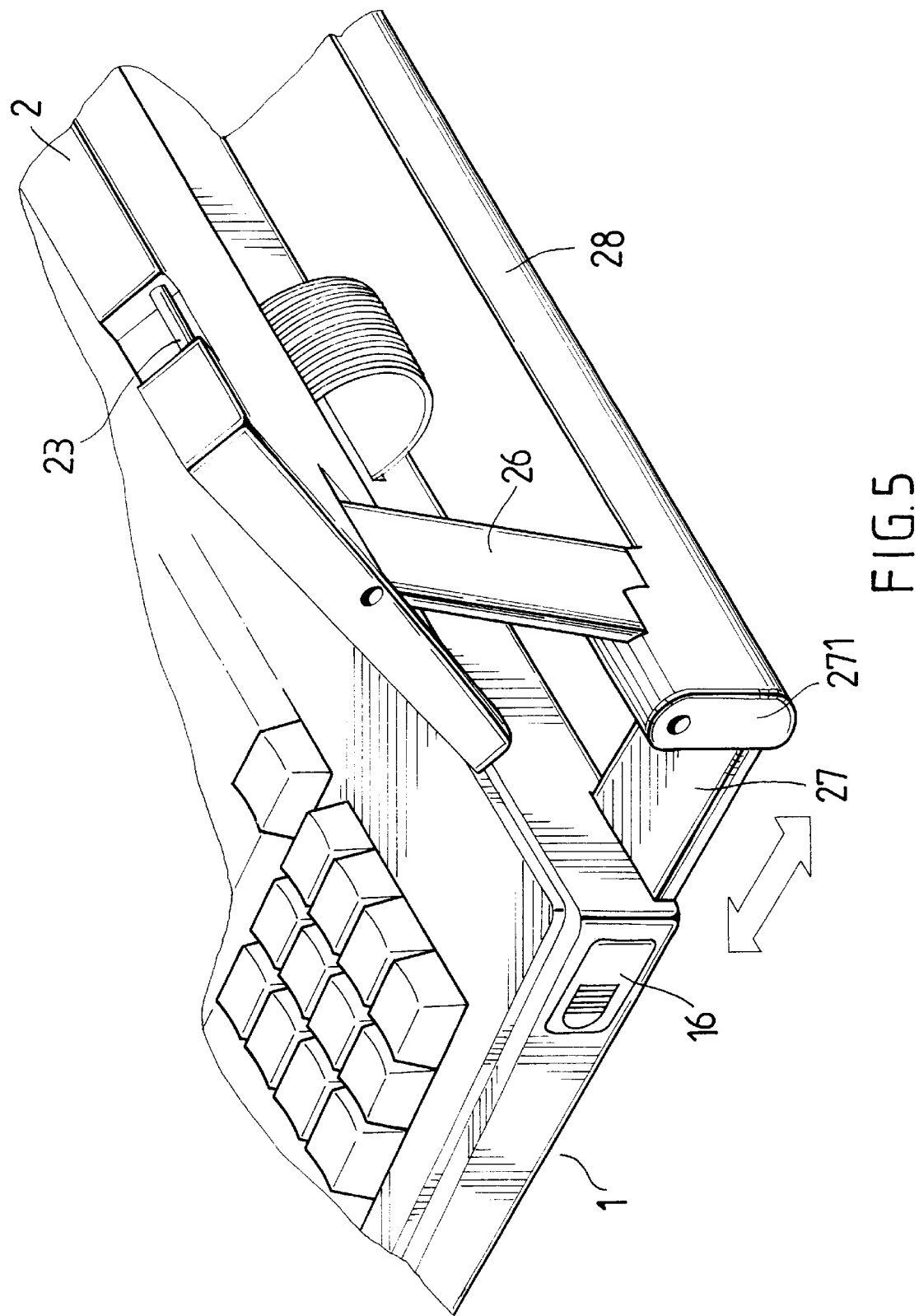
FIG. 5 is a partial perspective view of the screen being moved rearward from a keyboard of the computer in the present invention.

The dimensions of the computer sitting on a table can be adjusted by changing the distance between the keyboard 1 and the screen 2, as shown in FIG. 5. Changing the distance is effected by the guide slots 141, 141 in the recesses 14, 14 of the keyboard 1 and the guide screws 272, 272 of the bottom bars 27, 27. If the screen 2 is pushed backward, it can move straight back by the guide screws 272 moving back in the guide slots 141, 141 with the bottom bars 27, 27 also moved back to lengthen the distance between the keyboard 1 and the screen 2. In addition, the bottom bars 27, 27, the lateral plate 28 are on the same level with the bottom of the keyboard 1, so the bottom bars 27, 27 and the lateral plate 28 help in stabilizing the keyboard 1 on the table.

As for adjusting the sloping angle of the screen 2, it may be effected by tightness of pivotal connection between the support bars 26, 26 and the vertical side walls 271, 271 of the bottom bars 27, 27. Firstly, the support bars 26, 26 are pulled to a proper angle relative to the keyboard 1, and then the screen 2 is move relative to the support bars 26, 26 pivotally con-connected with the screen 2. Therefore, a user can adjust the screen 2 in its position and its angle to the keyboard 1 to suit to user's height to see the screen clearly and easily.

Figure 6:
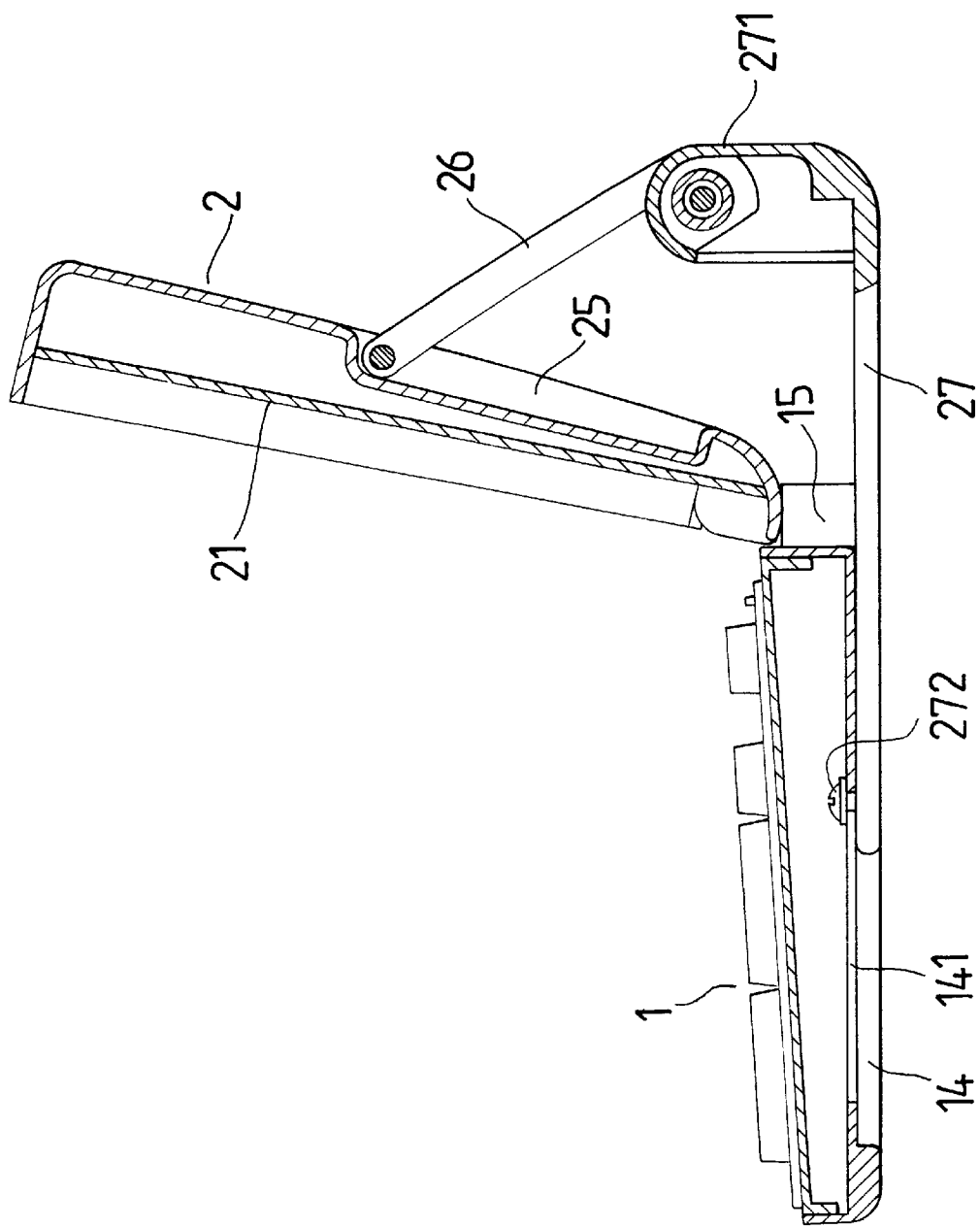
FIG. 6 is a side view of the screen swung out and placed on the keyboard with its lower end in the present invention; and, FIG. 7 is a perspective view of a conventional computer.
Figure 7:
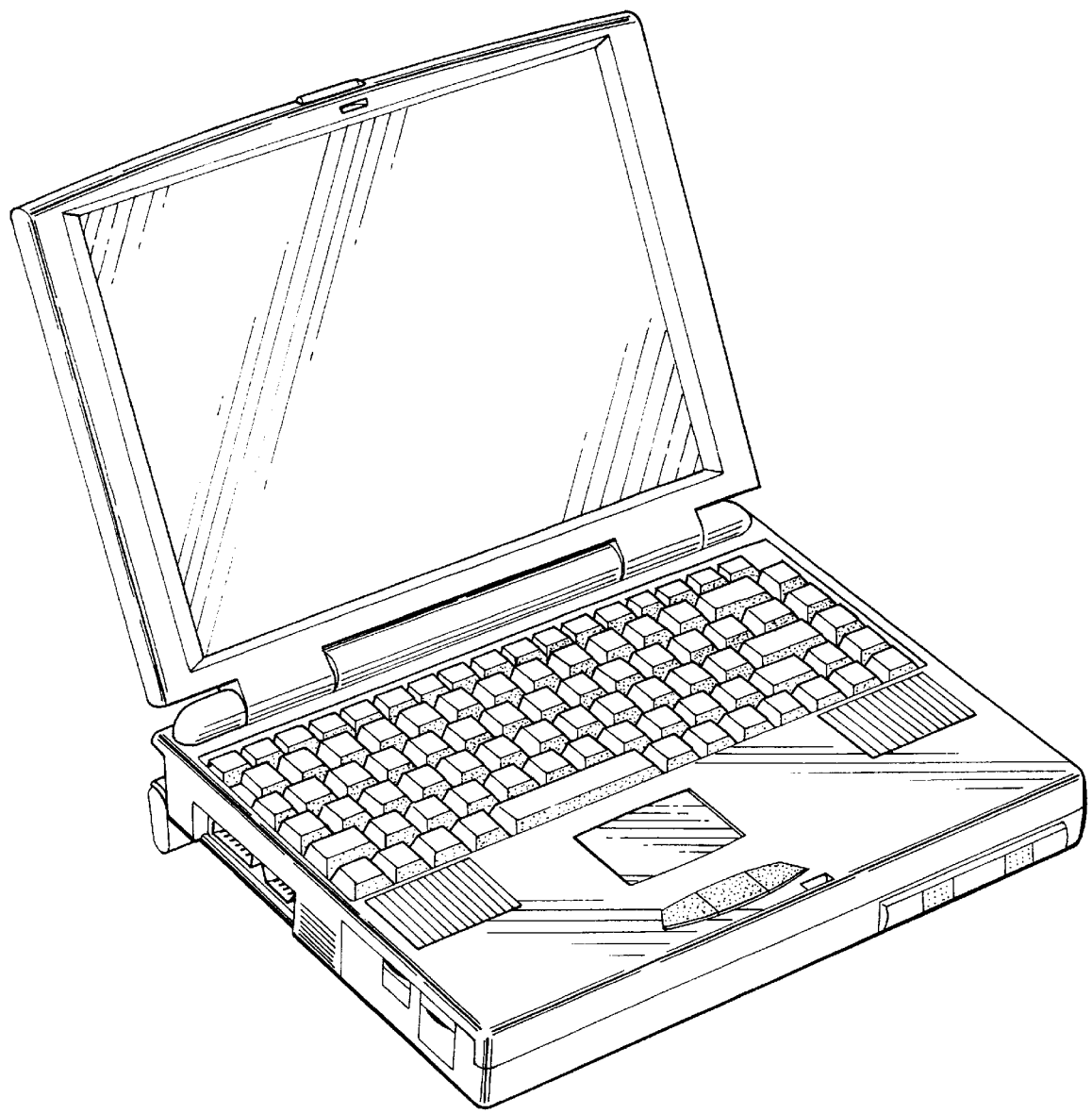

Further, an elongate bar 15 is provided on a rear side of the keyboard 1 for a lower end of the screen 2 to sit thereon in case of the screen 2 is in the swung-open position, as shown in FIG. 6.

As can be seen from the aforesaid description, this invention has the following advantages conventional computers do not have.

1. Dimensions of a computer sitting on a table can be increased by pulling the screen back to stabilize the computer on the table, by means of the guide slots of the recess of the keyboard and the guide screws of the bottom bars fitting and moving back and forth in the guide slots.

2. The screen can be adjusted in its angle relative to the keyboard by pivotal connection of the bottom bars with the support bars, and pivotal connection of the screen with the support bars, for a user to easily operate the computer.

While the preferred embodiment of the invention has been described above, it will be recognize and understood that various modifications may be made therein and the appended claims are intended to cover all such modifications which may fall within the spirit and scope of the invention.

What is claimed is:

1. An adjusting device for a screen of a computer comprising:

a keyboard having a latch respectively at two—right and left—sides of a front side, a guide slot in a bottom of an elongate recess provided respectively in two sides of a bottom of said keyboard, and a battery chamber formed in one side for containing a battery as power for said computer;

a screen having a lateral bar respectively at two opposite—right and left—sides of a front side to engage with said latches of said keyboard, a pair of recesses formed respectively in two sides in an upper surface, a pair of support bars having their upper ends pivotally connected with an upper end of each said recess for said support bars to rest therein, each said support bar having its lower end pivotally connected with a respective vertical side wall of each of said bottom bars, a lateral plate connected between said two bottom bars to move together, each said bottom bar having a guide screw fixed at an inner end, each said guide screw fitting and able to move in each said guide slot of said keyboard.

2. The adjusting device for a screen of a computer as claimed in claim 1, wherein said keyboard and said screen respectively have a grip pivotally fixed on a front side, and a curved recess in a bottom surface of said keyboard and an upper side of said screen for each said grip to rest in case of putting away said computer.

3. The adjusting device for a screen of a computer as claimed in claim 1, wherein an elongate bar is fixed on a rear side of said keyboard for a lower end of said screen to sit thereon in case of said screen swung open for use.

* * * * *